United States Patent
Hosie et al.

(10) Patent No.: US 9,398,087 B1
(45) Date of Patent: Jul. 19, 2016

(54) SECURE DEPLOYMENT OF AN APPLICATION ACROSS DEPLOYMENT LOCATIONS

(71) Applicant: INTERNATIONAL BUSINESS MACHINES CORPORATION, Armonk, NY (US)

(72) Inventors: John Hosie, Hursley (GB); Daniel J. McGinnes, Hursley (GB); Martin A. Ross, Hursley (GB); Craig H. Stirling, Hursley (GB); Dominic J. Storey, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/953,353

(22) Filed: Nov. 29, 2015

(51) Int. Cl.
G06F 15/16 (2006.01)
G06F 15/173 (2006.01)
H04L 29/08 (2006.01)

(52) U.S. Cl.
CPC ............ *H04L 67/1076* (2013.01); *H04L 67/10* (2013.01); *H04L 67/18* (2013.01); *H04L 67/327* (2013.01); *H04L 67/34* (2013.01)

(58) Field of Classification Search
CPC ........ H04L 67/10; H04L 67/327; H04L 67/34
USPC .......................................... 709/201, 202, 226
See application file for complete search history.

(56) References Cited

U.S. PATENT DOCUMENTS

| 8,434,080 B2 | 4/2013 | Yendluri |
| 8,984,132 B2 | 3/2015 | Sailer et al. |
| 2012/0005724 A1 | 1/2012 | Lee |
| 2013/0191539 A1* | 7/2013 | Sailer ...................... H04L 67/34 709/225 |
| 2013/0291127 A1 | 10/2013 | Bergman et al. |
| 2014/0075502 A1* | 3/2014 | Aissi ....................... G06F 21/60 726/1 |
| 2014/0359047 A1 | 12/2014 | Lee et al. |
| 2015/0052144 A1* | 2/2015 | Mari ................. G06F 17/30598 707/740 |
| 2015/0134424 A1* | 5/2015 | Matzlavi ............ G06Q 10/0637 705/7.36 |

OTHER PUBLICATIONS

Ahmadian et al., "Security of Applications Involving Multiple Organizationsz—Order Preserving Encryption in Hybrid Cloud Environments", http://ieeexplore.ieee.org/stamp/stamp.jsp?tp=&arnumber=6969476; 2014 IEEE, pp. 894-903.

Huang et al., "Efficiently Secure Data Privacy on Hybrid Cloud", IEEE ICCC 2013—Communication and Information ssytems Security Symposium, pp. 1936-1940.

Zhang et al., "Protecting Private Cloud Located within Public Cloud", Globecom 2013—Communication and Information System Security Symposium; 2013 IEEE, pp. 677-681.

\* cited by examiner

*Primary Examiner* — Hieu Hoang
(74) *Attorney, Agent, or Firm* — Cantor Colburn LLP; Richard Wilhelm

(57) ABSTRACT

Methods and systems are provided for secure deployment of an application across deployment locations. Aspects include providing an application for analysis wherein the application is capable of being divided into processing nodes which can be deployed in different locations. The application processes messages based on message models having annotations defining constraints on the deployment of data in given data aspects. The data aspects include the entire message or data fields, data elements or data structures of the message. Aspects also includes analyzing the application to identify processing nodes that reference the given data aspects having deployment constraints and determining a restriction for a processing node based on the deployment constraints of the referenced data aspects. Aspects further include deploying each processing node of the application according to the determined restriction.

20 Claims, 11 Drawing Sheets

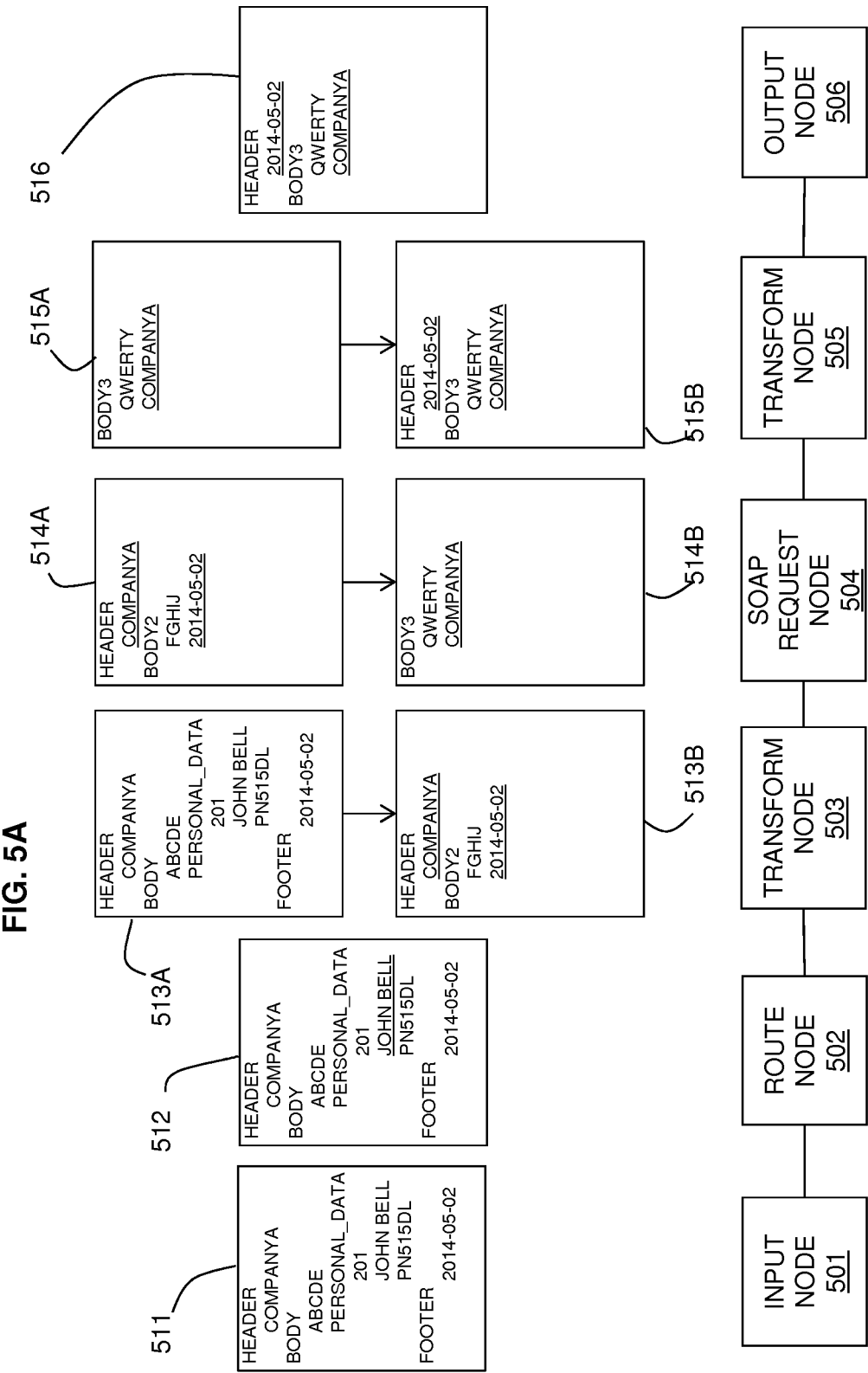

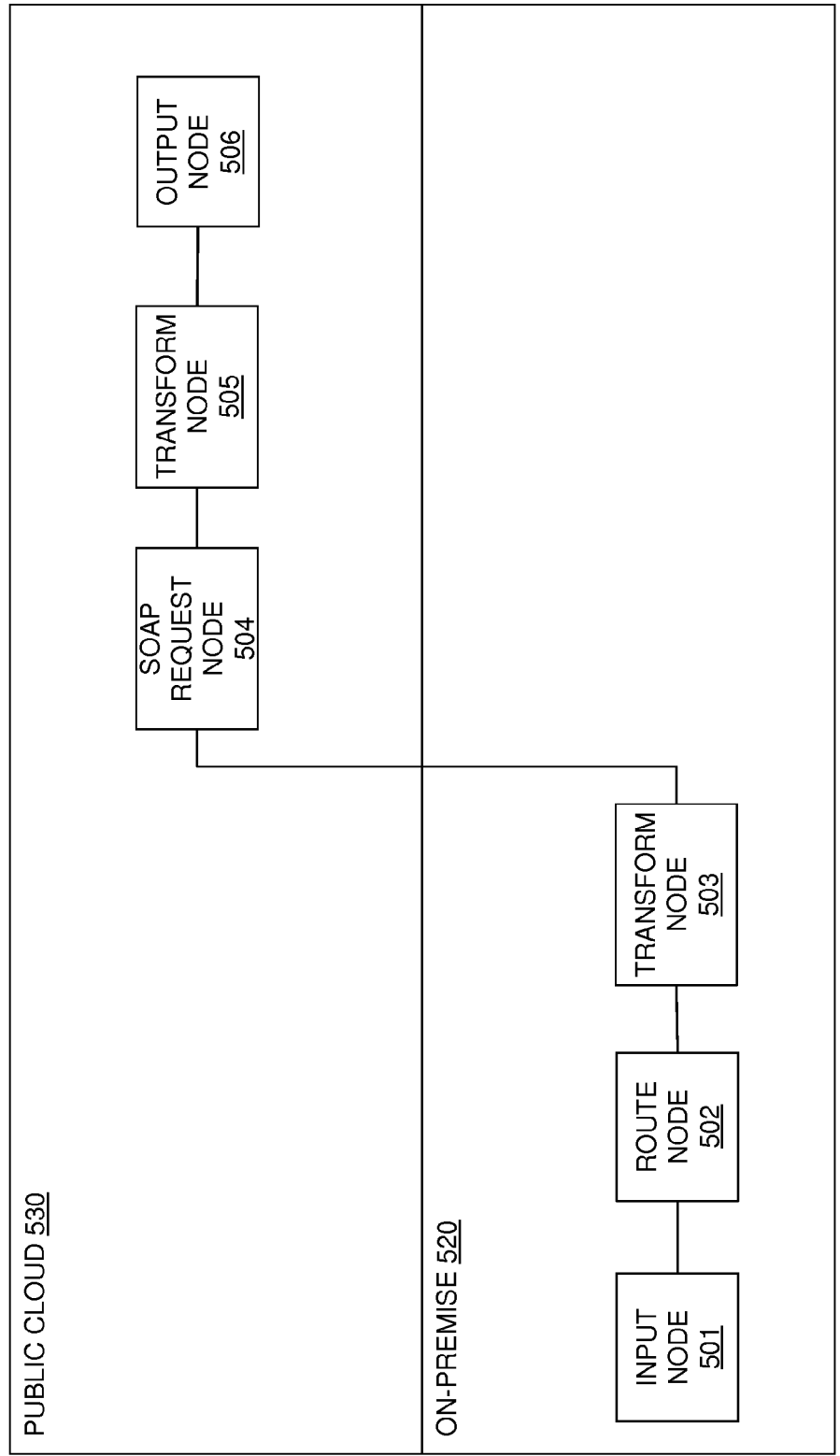

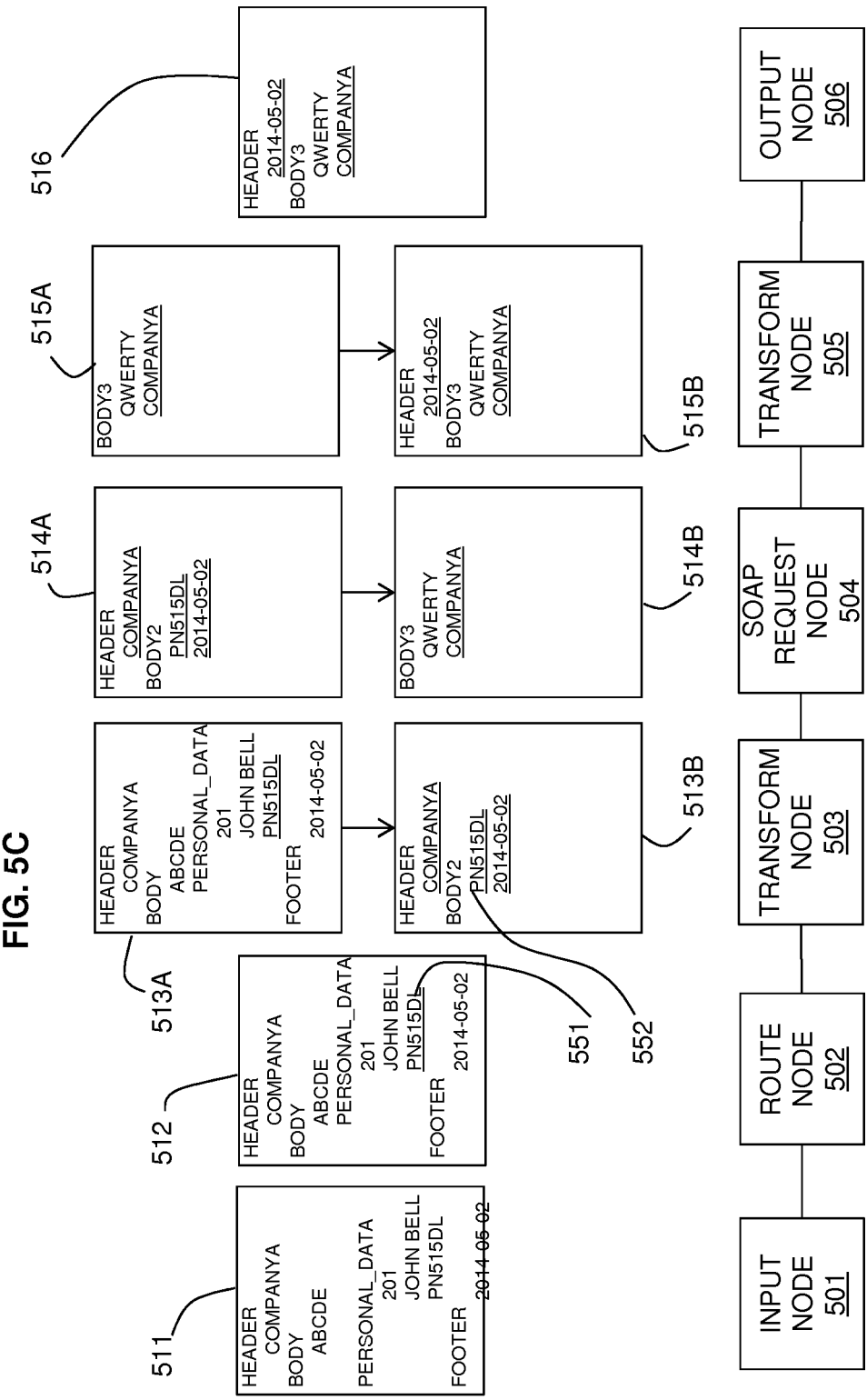

SECURE DEPLOYMENT OF AN APPLICATION ACROSS DEPLOYMENT LOCATIONS

BACKGROUND

The present invention relates to secure deployment of an application across deployment locations.

Products such as IBM Integration Bus (IBM and Integration Bus are trade marks of International Business Machines Corporation) provide options for a universal integration foundation based on enterprise service bus (ESB) technology. Implementations help to enable connectivity and transformation in heterogeneous information technology environments for businesses of any size, in any industry and covering a range of platforms including cloud environments and mainframe servers.

Certain integration flows may be performing actions on messages containing sensitive data, which is likely to have restrictions associated with where that data can flow. For instance, certain data may need to stay within the company firewall or not be allowed to go out of the country.

Utilizing cloud technologies enables companies to scale elastically to cope with demand, reduce and rationalize information technology infrastructure, reduce cost of operations and deploy systems faster, easier and on-demand.

Certain end-to-end integration applications or services may be running in hybrid cloud environments where some processing is performed in a public cloud space and some processing that may be using secure data, is run on-premise within the company firewall.

Secure connectors are known which connect to systems that are behind a firewall. For systems such as databases, secure connectors are required to run the integration. This enables an integration application running in a public cloud space to connect to an application running on-premise behind a company firewall.

SUMMARY

According to one embodiment of the present invention there is provided a computer-implemented method for secure deployment of an application across deployment locations, comprising: providing an application for analysis wherein the application is capable of being divided into processing nodes which can be deployed in different locations, and wherein the application processes messages based on message models having annotations defining constraints on the deployment of data in given data aspects, wherein data aspects include: the entire message or data fields, data elements or data structures of the message; analyzing the application to identify processing nodes that reference the given data aspects having deployment constraints; determining a restriction for a processing node based on the deployment constraints of the referenced data aspects; and deploying each processing node of the application according to the determined restriction.

According to a second embodiment of the present invention there is provided a system for secure deployment of an application across deployment locations, comprising: a processor and a memory configured to provide computer program instructions to the processor to execute the function of the following components arranged to provide the defined functionality; a receiving component for receiving an application for analysis wherein the application is capable of being divided into processing nodes which can be deployed in different locations, and wherein the application processes messages based on message models having annotations defining constraints on the deployment of data in given data aspects, wherein data aspects include: the entire message or data fields, data elements or data structures of the message; an analyzing component for analyzing the application to identify processing nodes that reference the given data aspects having deployment constraints; a determining component for determining a restriction for a processing node based on the deployment constraints of the referenced data aspects; and a deployment component for deploying each processing node of the application according to the determined restriction.

According to a third embodiment of the present invention there is provided a computer program product for secure deployment of an application across deployment locations, the computer program product comprising a computer readable storage medium having program instructions embodied therewith, the program instructions executable by a processor to cause the processor to: provide an application for analysis wherein the application is capable of being divided into processing nodes which can be deployed in different locations, and wherein the application processes messages based on message models having annotations defining constraints on the deployment of data in given data aspects, wherein data aspects include: the entire message or data fields, data elements or data structures of the message; analyze the application to identify processing nodes that reference the given data aspects having deployment constraints; determine a restriction for a processing node based on the deployment constraints of the referenced data aspects; and deploy each processing node of the application according to the determined restriction.

The described aspects of the invention provide the advantage of a simple and easy to use deployment model for customers wanting to deploy an application for example to a distributed environment or hybrid cloud environment.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Exemplary embodiments of the present invention will now be described, by way of example only, with reference to the following drawings in which:

FIGS. 5A and 5B are schematic diagrams of an example of a message flow deployment in an integration environment illustrating a method in accordance with the present invention;

FIG. 5C is a schematic diagram of a second example of a message flow deployment showing the defined tracking aspect in accordance with the present invention;

Figure 1A:
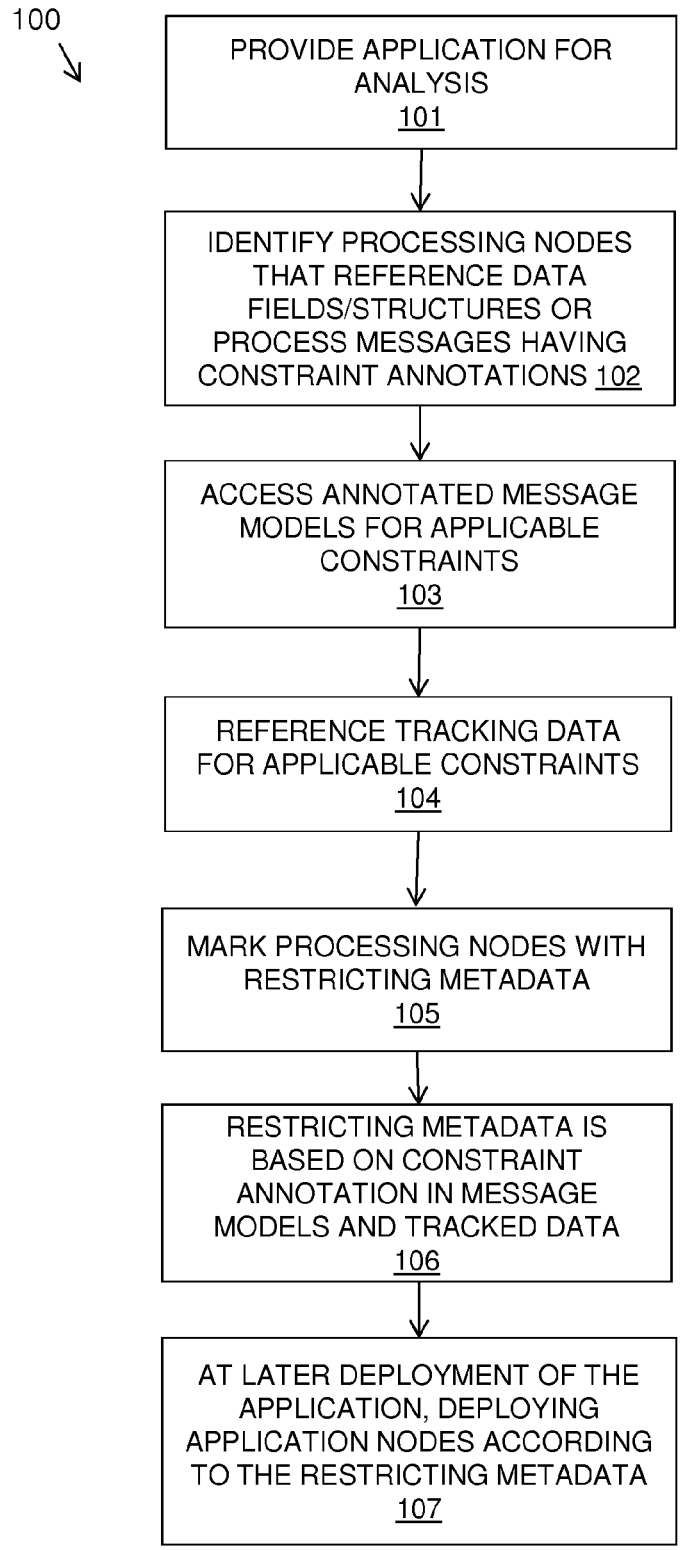
FIGS. 1A and 1B are flow diagrams of two example embodiments of a method in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Information may be required to flow between disparate applications across multiple hardware and software platforms. One architecture which supports this is Enterprise Service Bus architecture providing integrated connectivity between applications and services in a service-oriented architecture. IBM Integration Bus (formerly WebSphere Message Broker, wherein IBM and WebSphere are trade marks of International Business Machines Corporation) is an example of such an architecture, which allows business information to flow as an integration application with rules applied to the data glowing through an integration node (also referred to as a message broker) to route and transform the information.

Other architectures may include distributed computing in which a distributed system is a software system in which components are located on networked computers and communicate and coordinate their actions by passing messages. Distributed applications may be processed across a distributed computing architecture.

The described method and system are described in the field of integration flows or applications, which may be deployed across different locations including using a hybrid cloud environment. However, it will be appreciated by a person skilled in the art that equivalent methods and systems may be applied to a distributed computing environment.

In the described method and system, a description or model of a data structure, that may be for example in the form of a message model, is annotated to identify aspects, such as fields or structures, or elements within the structures that have particular restrictions. For instance, data within a particular field or structure may be restricted to a company premises, restricted to within a company firewall, restricted to a country, or may be un-restricted and free to enter the public cloud.

An integration application is then analyzed to determine what data fields or structures the particular processing of the application is acting on. The analysis may identify the processing nodes that may be performed with varying restrictions based on the restrictions provided in the message model. The restrictions may restrict the processing to certain locations or categories of locations corresponding to the restrictions defined in the message model. The processing nodes may be marked with metadata indicating the restriction.

The analysis and restricting metadata marking may be carried out as the application is developed and packaged with the restricting metadata being marked in the nodes of the application. Alternatively, this may be performed at deployment time of the application in which case the metadata may not be marked at a node and instead the node may be deployed according to the applicable restriction.

When the integration application is deployed, the processing nodes are deployed appropriately within the environment based on the data fields or structures they are processing.

Advantageously, a Chief Information Security Officer (CISO) or other appropriate administrator may set restrictions on data security up-front which are then applied to the message model. Subsequently the application or integration developer and administrators do not need to have in-depth knowledge of what restrictions there are on the data. This makes development and administration of applications in a hybrid cloud environments more efficient, reducing costs and complexity.

A deployment system in a system for processing data, where data can be processed securely (i.e. on premise) or may be processed in a less secure environment (e.g. cloud), may distribute the processing by examining the restricting metadata (either marked in the node or generated on the fly) relating to security or privacy, and based on rules may restrict certain parts of that data to being processed in a more secure environment, whilst allowing data that is not sensitive to be processed in a less secure environment.

The method describes augmenting the message model and using this, in coordination with application analysis, to determine appropriate deployment locations for different parts of a distributed application and subsequently where processing should take place. The described method and system provide a logical break between the message model and the code such that the developer does not need to know about restrictions on data propagation as this is set at the message model level by appropriate architects.

Message models in general provide a separation between the code and the description of the message. This separation is used to advantage in the deployment of applications accessing secure data to hybrid cloud environments.

Figure 1B:
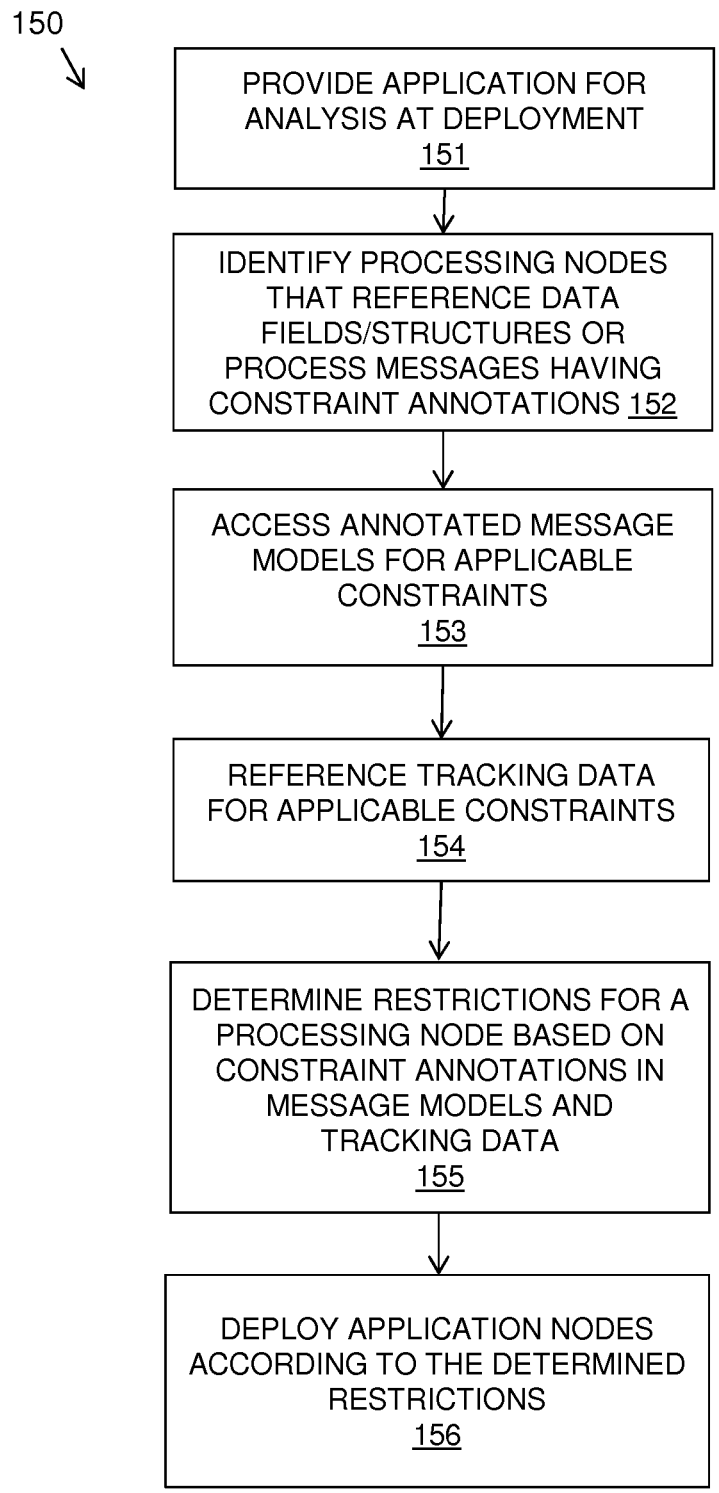

FIGS. 1A and 1B shows flow diagrams 100, 150 illustrating two example embodiments of the described method, one at development of an application and the other at deployment of the application. Referring to FIG. 1A, a flow diagram 100 illustrates an example embodiment of the described method, which may be carried out at an application development stage of an application that may be deployed across multiple systems.

As a preliminary step, message models may be annotated with constraints to provide restrictions to the use of data in aspects of a message. The aspect of the message to which the constraint is applied may be a whole message, a complex element (which may contain child complex elements or simple elements/fields), or individual elements or fields of a message. The restrictions may be provided as constraints in the message model that define where the data may be deployed. Annotating the message model may identify data fields or structures that need to stay within boundary X, boundary Y, etc. (i.e. within a department, a firewall, a country, etc.). The message model is augmented to describe transient data being processed by an application and using this for the determination of deployment locations.

A message model provides an annotated model of a message format, for example, a message model may be an annotated Extensible Markup Language (XML) Schema model or a Data Format Description Language (DFDL) schema model.

If creating a message model, an administrator may create an element or field and may set a property on the element or field to specify a constraint. If an existing message model is being modified, the administrator may modify existing elements or fields by setting an appropriate constraint property. An application when being developed may pull message models into the application flow for use by nodes or subsets of the application that process messages defined by the message models. An application may be provided 101 for analysis at development of the application. The application may have processing nodes or code subsets that may be deployed across multiple systems that may, for example, be distributed across a network, or a hybrid cloud environment.

Analysis is carried out of the application and identifies 102 processing nodes of the application that reference data fields, elements or structures or process messages with constraints imposed in their message model. The analysis may access 103 the annotated message models in which aspects of the message, such as data fields, elements and/or data structures, have been annotated with constraints to obtain details of the restrictions on deployment locations of the data in the fields, elements and/or structures.

In one embodiment, the analysis may also access 104 tracking data relating to aspects of messages which have restrictions applied and which have moved to target aspects of messages which are un-constrained. The target aspects may be tracked and corresponding constraints applied to their data. The nodes of the application may be marked 105 with restricting metadata to indicate the restriction on the distribution of the node. The restricting metadata is based 106 on the annotation of the constraint in the message model relating to the aspect of the method (message, data field, element or structure) used by the node.

At later deployment of the application, the restricting metadata of the processing nodes may be read and different nodes of the application may be sent 107 for processing by systems meeting the restricting metadata requirements for that node.

Referring to FIG. 1B, a flow diagram 150 illustrates an example embodiment of the described method which may be carried out at on the fly at the deployment of an application that may be deployed across multiple systems. As with the method of FIG. 1A, as a preliminary step, message models may be annotated with constraints to provide restrictions to the use of data in aspects of a message. An application may be provided 151 for deployment. The application may have processing nodes that may be deployed across multiple systems that may, for example, be distributed across a network, or a hybrid cloud environment.

Analysis is carried out of the application and identifies 152 processing nodes of the application that reference data fields, elements or structures or process messages with constraints imposed in their message model. The analysis may access 153 the annotated message models in which aspects of the message, such as data fields, elements and/or data structures, have been annotated with constraints to obtain details of the restrictions on deployment locations of the data in the fields, elements and/or structures. In one embodiment, the analysis may also access 154 tracking data relating to aspects of messages which have restrictions applied and which have moved to target aspects of messages which are un-constrained. The target aspects may be tracked and corresponding constraints applied to their data.

The restrictions for a processing node may be determined 155 based on the constraint annotations in the message models and tracking data and the nodes of the application may be deployed 156 according to the determined restrictions and different nodes of the application may be sent for processing by systems meeting the restriction requirements for that node. Breaking an application into nodes for deployment, for example, with some nodes being on premise and some in a public cloud environment, enables cloud-bursting of processing when on premise resources become constrained.

Figure 2:
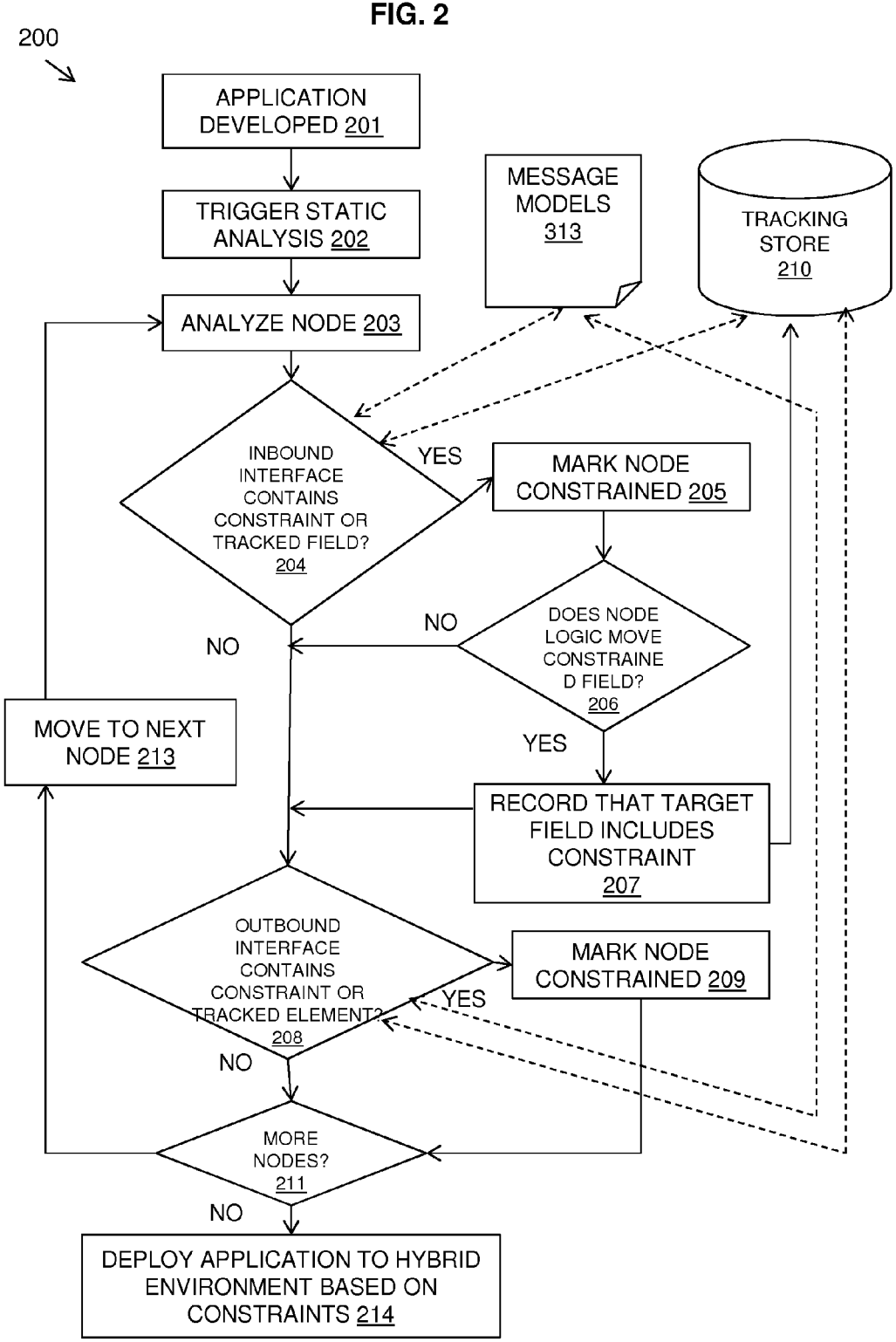
FIG. 2 is a flow diagram of a more detailed example embodiment of a method in accordance with the present invention.

Referring to FIG. 2, a flow diagram 200 shows a more detailed example embodiment of the described method as carried out after development of an application 201 that may be deployed across multiple systems. This embodiment is provided in an integration environment in which an application is an integration flow with nodes having one or more inbound interfaces and one or more outbound interfaces. A corresponding application in a distributed environment may use a similar method.

Static analysis of the developed application may be triggered 202 and a node of the application may be analyzed at step 203. It may be determined 204 if an inbound interface of the node contains constrained fields or data. This may reference the message model to determine constraints provided against fields or data. This may also reference a tracking store 210 which records fields which have constraints applied. If the node does not include a constrained field, then the method continues to step 208 described below.

If the node includes a constrained field, the node may be marked 205 as restricted appropriately. It may then be determined 206 if the node logic moves a constrained field to any other field on an outbound interface. If the logic does not move to a constrained field, then the method may continue to step 208 described below. However, if the logic does more a constrained field, it is recorded 207 in the tracking store 210 that the target field contains constrained data before continuing to step 208.

At step 208, it may be determined if an outbound interface of the node contains a constrained field of data. This may also reference a tracking store 210 which records fields that have constraints applied. If there are such constrained fields, the node may be marked 209 as restricted accordingly. It may then be determined 211 if there are more nodes in the application. If so, the method may loop to analyze the next node 213 at step 203. If there are no more nodes, the application may be deployed 214 to a hybrid environment deploying each node to an appropriate location based on any constraints marked in the nodes.

The tracking store 210 in this embodiment is used during the analysis prior to deployment. Seeing that a constrained field is used to create a new message which is based on a schema that does not specify constrains, the static analysis with reference to the tracking store 210 may identify that when that new message is processed by a subsequent node, although the model currently being used does not have any constraints, the message does contain a field that was marked as constrained in a previous message model thus limiting the scope of deployment or processing for said node.

The tracking method may involve analyzing the logic in the node itself as opposed to just the interfaces. This may be analyzing product APIs or more generally (i.e. XSLT, XQuery, etc.) to understand what fields are moved or used as input to other outbound fields with knowledge of the APIs or general transformation technology.

Figure 3:
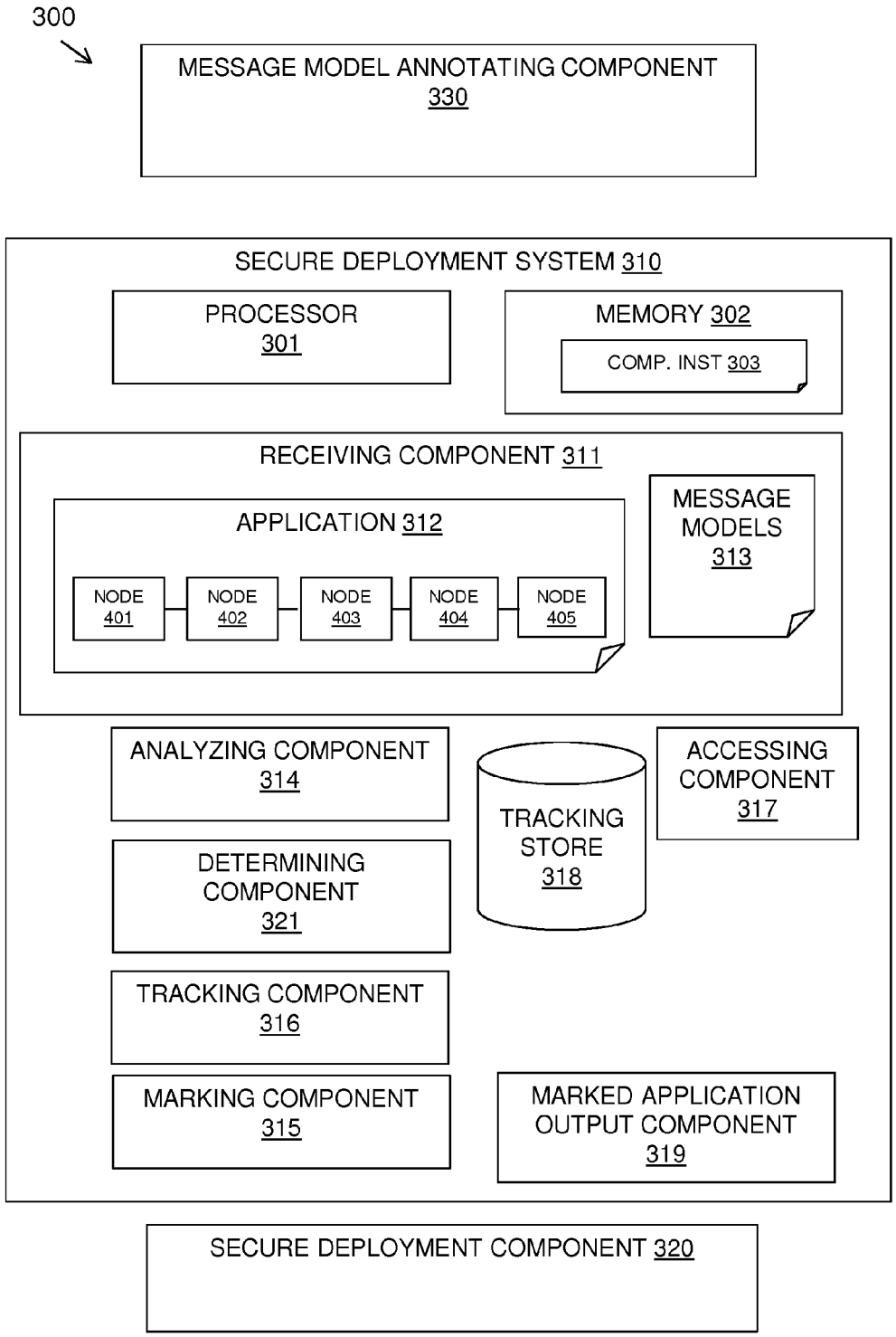
FIG. 3 is block diagram of an example embodiment of a system in accordance with the present invention.

Referring to FIG. 3, a block diagram shows an example embodiment of a described system 300. The system 300 includes a secure deployment system 310. The secure deployment system 310 may be provided as part of a development system for application development or as part of a deployment system for application deployment across deployment locations. A secure deployment component 320 is shown separately in FIG. 3, however this may be incorporated as an output component of the secure deployment system 310 if this is provided as a deployment system.

A message model annotating component 330 may be provided which may be separate to the secure deployment system 310 and provided as a user interface for an administrator to annotate message models with deployment constraints as described herein. This may be separate to the application development. The secure deployment system 310 may include a processor and a memory configured to provide computer program instructions to the processor to execute the function of the following components arranged to provide the defined functionality.

The secure deployment system 310 may include a receiving component 311 arranged for receiving an application 312 for analysis wherein the application is capable of being divided into processing nodes 401-405 which may be deployed in different locations. The application 312 processes messages based on message models 313 having annotations defining constraints on the deployment of data in given data fields or structures of the message. An accessing component 317 may be provided for accessing the required message models 313.

The secure deployment system 310 may include an analyzing component 314 arranged for analyzing the application to identify processing nodes 401-405 that reference the given data fields or structures having deployment constraints as defined by the annotations in the message models 313. The analyzing component 314 may also reference a tracking component 316 arranged for tracking data fields or structures having deployment constraints and determining if a data field or structure having deployment constraints is moved from a processing node 501-505. A tracking store 318 may be provided for recording that a moved data field or structure has deployment constraints.

The secure deployment system 310 may include a determining component 321 for determining a restriction for a processing node based on the deployment constraints of the referenced data fields and structures.

In the embodiment in which the secure deployment system 310 is operated prior to deployment, the secure deployment system 310 may include a marking component 315 arranged for marking processing nodes 401-405 with restricting metadata corresponding to the deployment constraints annotated in the message model 313 relating to the given data fields or structures accessed by the processing node. A marked application output component 319 may output the marked application to a separate deployment component 320, if required. The deployment component 320 may read the restricting metadata and deploy each processing node 401-405 according to the deployment constraints.

In the embodiment in which the secure deployment system 310 is operated at deployment of an application the determining component 321 may output the determined restriction for a processing node to the secure deployment component 320 which may deploy the processing node accordingly.

Figure 4:
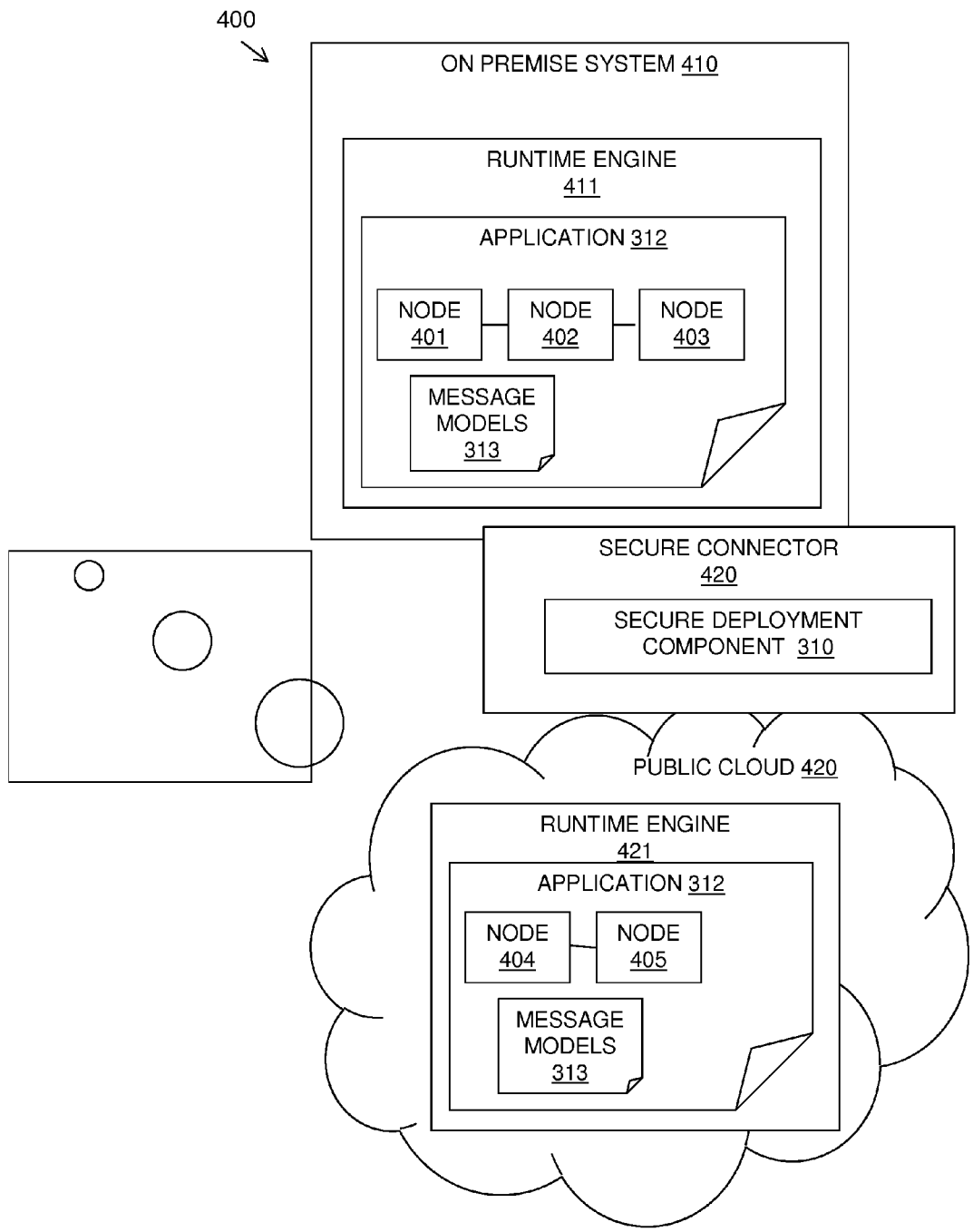
FIG. 4 is a block diagram of an embodiment of a computer system in which the present invention may be implemented.

Referring to FIG. 4, a block diagram shows an example system 400 in which the described method and system may be implemented. The example system 400 shown is an application 312 in the form of an integration application deployed across a hybrid cloud environment. For simplicity of illustration, the hybrid cloud environment is shown as an on premise system 410 and a public cloud 420.

The on premise system 410 and the public cloud 420 may have runtime engines 411, 421 respectively. The runtime engines 411, 421 run applications that are deployed to them. In one example embodiment, a runtime engine may be an integration server. The application references libraries that may typically contain associated resources, such as the message models 313.

The integration application 312 has processing nodes 401-405 with associated message models 313. Each of the nodes 401-405 may be executed in the runtime engine 411 on premise or the runtime engine 421 on the public cloud (or other locations in a more complex arrangement). When the logic in the application 312 reaches a node 401-405, if it is to be performed on the public cloud 420 then a message and context that is being processed is sent to that runtime engine 421. If it is to be performed on the on premise system 410, then a message and context that is being processed is sent to the runtime engine 411 on the on premise system 410.

A secure connector 420 may be provided as a process running in a location (on-premise, in the cloud, or split between the two) that connects the runtime engine 411 on-premise to the runtime engine 421 in the cloud 420. Once the processing completes in the cloud runtime engine 42l control returns to the on-premise runtime engine 411. So the secure connector 420 is an external process in relation to the runtime engines 411, 421 invoked and connects the on premise runtime engine 411 to the runtime engine 421 in the cloud.

The described secure deployment component 310 may be provided at the secure connector 420 and may read restricting metadata at a processing node 401-405 and determine which runtime engine 411, 421 the node may be deployed to.

An example is now provided illustrating the described method.

When describing a message structure with a message model (XML/DFDL schemas etc.) an administrator may additionally provide annotations setting restrictions on particular data structures or fields. The following example imposes a restriction on FIELD2 that it does not leave the company firewall and that the data in the complex structure PERSONAL_DATA is not allowed to leave the country:

HEADER::
FIELD1:: STRING
BODY::
FIELD2::STRING::ONPREM
PERSONAL_DATA::::COUNTRY
   FIELD3::INTEGER
   FIELD4::STRING
   FIELD5::STRING
FOOTER::
FIELD6::DATETIME

FIELD2 and PERSONAL_DATA fields/elements (including the sub-elements FIELD3, FIELD4 and FIELD5) have constraints. If a node has an interface with these fields, it must be executing in an appropriate environment.

An integration flow developer may subsequently pull said message model into an integration flow that processes the messages described. When the application is completed and packaged or deployed static analysis of the code may take place to determine what nodes of the application access fields or process messages with constraints imposed in the message model. Advantageously, this may additionally include tracking data that exits the message model, for example, taken from FIELD2 above and moved to a non-constrained field in another message model to make an outbound invocation.

The application nodes may then be marked based on the analysis to state where they may be deployed. The nodes acting on "ONPREM" constrained data may only be deployed to an on-premise environment.

A first example integration and subsequent deployment is shown in FIGS. 5A and 5B. The example embodiment shown in FIG. 5A of a message flow 500 of an integration through the nodes of input 501, route 502, transform 503, SOAP request 504, transform 505 and output 506. When message boxes are shown on top of each other, this shows the message at the top being transformed to that at the bottom, or the message at the top being sent out to external service and that on the bottom being returned.

A message 511 is received at the input stage 501 to the message flow. The message 511 is routed 502 based on the field underlined in the message. For simplicity the other paths that could be chosen from this point are not shown. The message 513 is transformed 503 from the message shown at the top 513A to that shown at the bottom 513B. Fields that are underlined show data that propagates to the outbound message of the transform node 503. The message 514A at the top of the SOAP request node 504 is sent to an external SOAP service and the response below 514B is received. Neither interface references any constrained fields so this node can execute in a lower security environment. The message 515A at the top of the transform node 505 is transformed to that shown at the bottom 151B. The message 516 shows at the output node 506 is output from the integration.

The message models for the interfaces between the input node 501 and the route node 502 and between the route node 502 and the transform node 503 have FIELD2 field and PERSONAL_DATA fields and elements (including sub-elements field3, field4 and field5) being constrained. So if a node has an interface with these fields it must be executing in an appropriate environment.

FIG. 5B illustrates the outcome of the integration deployment of the message flow 500. The input node 501, route node 502, transform node 503 are processing constrained data so need to be processed on-premise 520. These are marked with restricting metadata and deployed on-premise. The request node 504, second transform node 505 and the output node 506 are not processing constrained data so can be deployed and processed in a public cloud environment 530.

They could be used in a cloud environment if the geographical location of said environment was known or could be specified. Or could not be sent to a database (for instance) if the location of said database was unknown or outside of said geographical constraint. Under such circumstances the data would not be sent (stripped from the content). This could potentially cause an error in the application reported back to administrators/developers.

Referring to FIG. 5C, a second example integration is shown illustrating a tracked field 551 with value PN515DL Although the interface's message model between the transform node 503 and the request node 504 does not contain any constrained fields, the static analysis has shown that the constrained field 551 (with value PN515DL) has been moved to an un-constrained field 552. So as this contains constrained data it cannot leave the constraint (i.e. on premise). Therefore request node 504 must be processed on premise. The interfaces between the request node 504 and the transform node 505 and between the transform node 505 and the output 506 do not contain constrained data and no data has been tracked entering these message models that was constrained, therefore the last two nodes 505, 506 may be processed in a public environment.

Although the above implementation and description is based on an integration application the methods are more broadly applicable to any application that may be broken into constituent parts.

Figure 6:
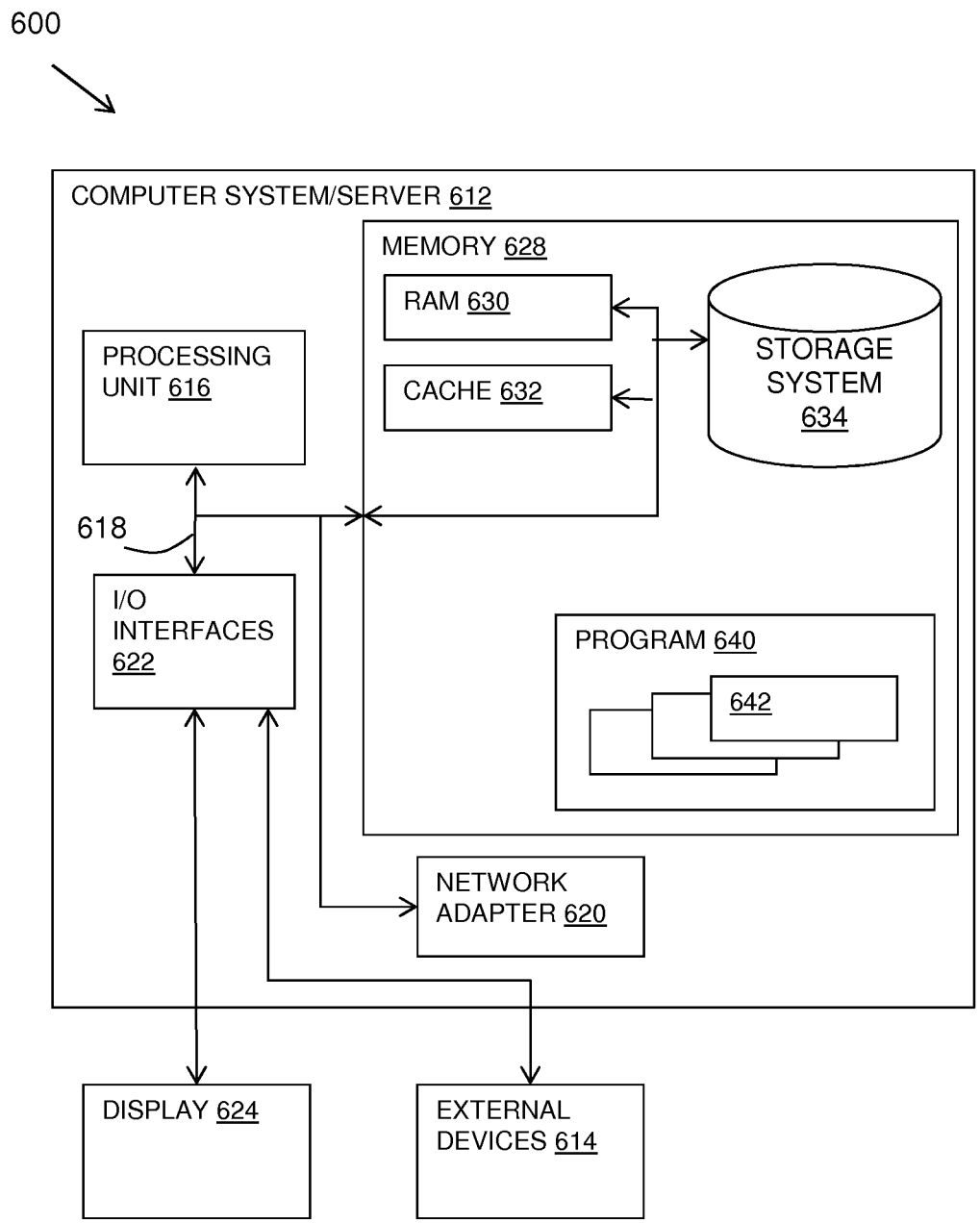
FIG. 6 is a block diagram of an embodiment of a computer system or cloud server in which the present invention may be implemented.

Referring now to FIG. 6, a schematic of an example of a system 600 in the form of a computer system or server is shown.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
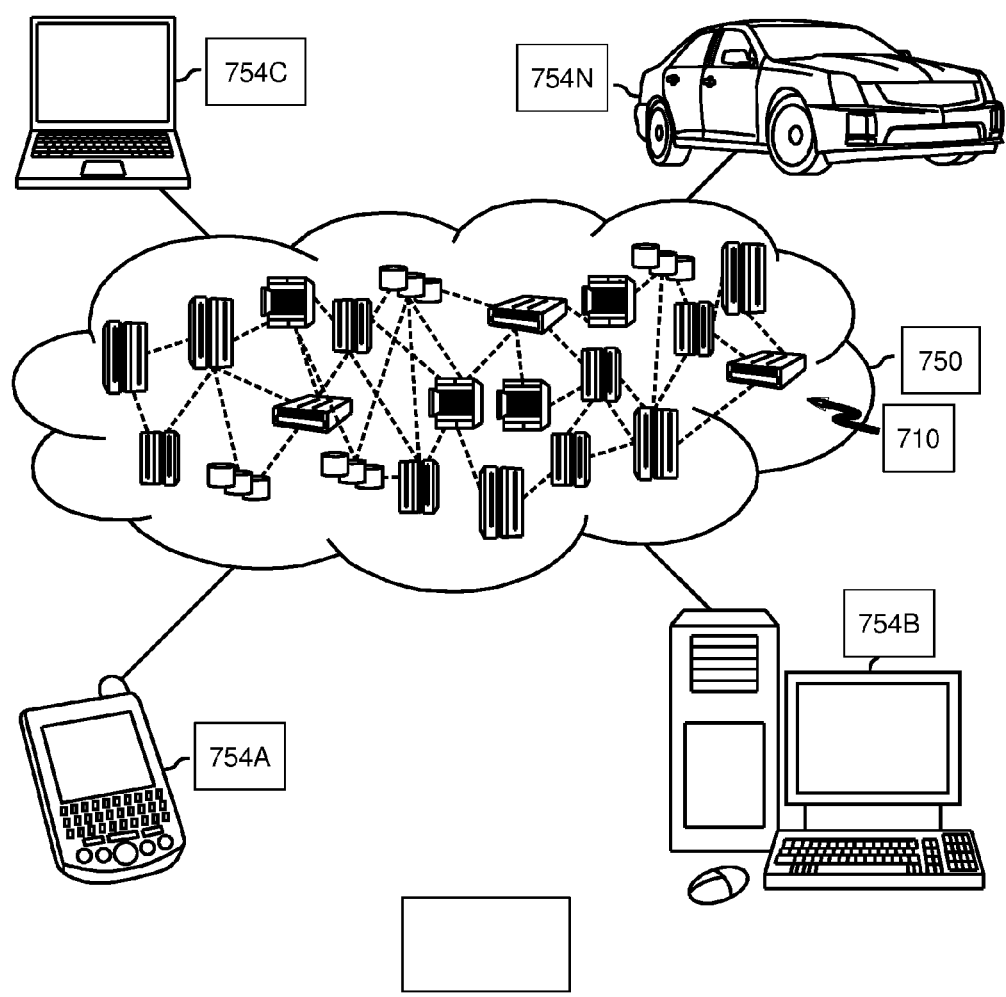
FIG. 7 is a schematic diagram of a cloud computing environment in which the present invention may be implemented.

Referring now to FIG. 7, illustrative cloud computing environment 750 is depicted. As shown, cloud computing environment 750 comprises one or more cloud computing nodes 600 with which local computing devices used by cloud consumers, such as, for example, personal digital assistant (PDA) or cellular telephone 754A, desktop computer 754B, laptop computer 754C, and/or automobile computer system 754N may communicate. Nodes 600 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 600 and cloud computing environment 750 can communicate with any type of computerized device over any type of network and/or network addressable connection (e.g., using a web browser).

Figure 8:
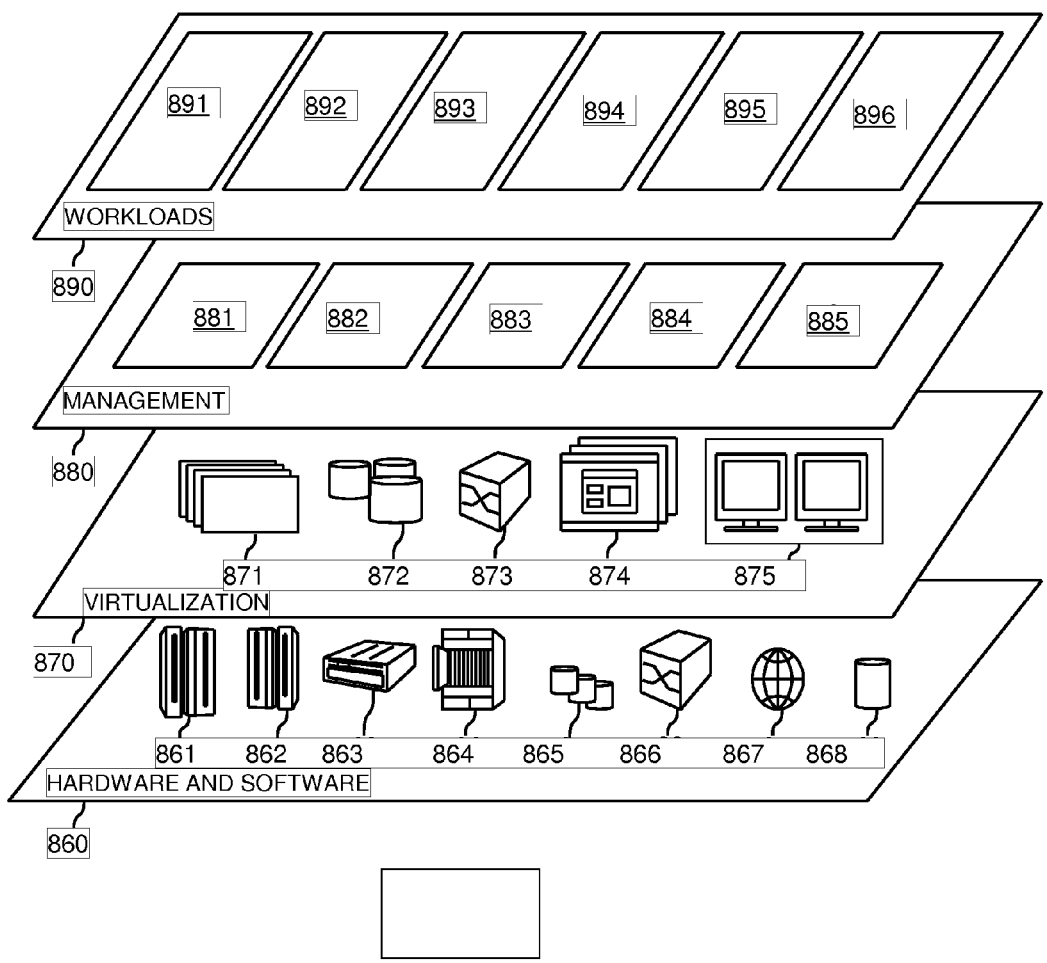
FIG. 8 is a diagram of abstraction model layers of a cloud computing environment in which the present invention may be implemented.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and deployment and connection functionality 896 for secure deployment across deployment locations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for secure deployment of an application across deployment locations, comprising:
    providing an application for analysis wherein the application is capable of being divided into processing nodes which can be deployed in different locations, and wherein the application processes messages based on message models having annotations defining constraints on deployment of data in given data aspects, wherein data aspects include: an entire message or data fields, data elements or data structures of the message;
    analyzing the application to identify processing nodes that reference the given data aspects having deployment constraints;
    determining a restriction for a processing node based on the deployment constraints of the referenced data aspects; and
    deploying each processing node of the application according to the determined restriction.

2. The method as claimed in claim 1, wherein the analyzing and determining is carried out dynamically at deployment of the application.

3. The method as claimed in claim 1, wherein the analyzing and determining is carried out in advance of the deployment of the application, and the method including:
    marking processing nodes with restricting metadata corresponding to the deployment constraints annotated in the message model relating to the given data aspects referenced by the processing node.

4. The method as claimed in claim 3, wherein deploying is carried out on marked processing nodes by reading the restricting metadata and deploying each processing node according to the restriction.

5. The method as claimed in claim 1, including:
    tracking data aspects having deployment constraints;
    determining if a data aspect having deployment constraints is moved to a target data aspect which does not have deployment constraints; and
    recording that the target data aspect has deployment constraints.

6. The method as claimed in claim 5, wherein analyzing the application to identify processing nodes that reference the given data aspects having deployment constraints includes determining if a given data aspect is tracked as having deployment constraints.

7. The method as claimed in claim 1, including:
    accessing the message models to determine the deployment constraints annotated in the message model for given data aspects.

8. The method as claimed in claim 5, including:
    accessing tracking data to determine deployment constrains for given data aspects.

9. The method as claimed in claim 1, wherein a logical break is provided between the message models and a code of the application enabling deployment constraints to be only defined in the message model.

10. The method as claimed in claim 1, wherein the application is a distributed application having processing nodes capable of being deployed across distributed resources.

11. The method as claimed in claim 1, wherein the application is an integration flow with processing nodes having one or more inbound interface and one or more outbound interface, and wherein analyzing the application to identify processing nodes that reference the given data aspects includes determining if an inbound interface or an outbound interface contains the given data aspects with deployment constraints.

12. The method as claimed in claim 1, wherein the application is capable of being deployed in a hybrid cloud environment and the deployment constraints relate to locations of deployment in the hybrid cloud environment including one or more of a group of: local client deployment, on premise deployment, within an enterprise deployment, within a geographical location deployment, or in a public cloud deployment.

13. A system for secure deployment of an application across deployment locations, comprising:
a processor and a memory configured to:
receive an application for analysis wherein the application is capable of being divided into processing nodes which can be deployed in different locations, and wherein the application processes messages based on message models having annotations defining constraints on deployment of data in given data aspects, wherein data aspects include: an entire message or data fields, data elements or data structures of the message;
analyze the application to identify processing nodes that reference the given data aspects having deployment constraints;
determine a restriction for a processing node based on the deployment constraints of the referenced data aspects; and
deploy each processing node of the application according to the determined restriction.

14. The system as claimed in claim 13, wherein the analyzing and determining is carried out dynamically at deployment of the application.

15. The system as claimed in claim 13, wherein the analyzing and determining is carried out in advance of the deployment of the application, and the processor further configured to mark processing nodes with restricting metadata corresponding to the deployment constraints annotated in the message model relating to the given data aspects referenced by the processing node.

16. The system as claimed in claim 15, wherein deploying is carried out on marked processing nodes by reading the restricting metadata and deploying each processing node according to the restriction.

17. The system as claimed in claim 13, wherein the processor further configured to:
track data aspects having deployment constraints;
determine if a data aspect having deployment constraints is moved to a target data aspect which does not have deployment constraints; and
record that the target data aspect has deployment constraints.

18. The system as claimed in claim 17, wherein analyzing the application to identify processing nodes that reference the given data aspects having deployment constraints includes determining if a given data aspect is tracked as having deployment constraints.

19. The system as claimed in claim 13, wherein the processor further configured to access the message models to determine the deployment constraints annotated in the message model for given data aspects.

20. A computer program product for secure deployment of an application across deployment locations, the computer program product comprising a non-transitory computer readable storage medium having program instructions embodied therewith, the program instructions executable by a processor to cause the processor to:
provide an application for analysis wherein the application is capable of being divided into processing nodes which can be deployed in different locations, and wherein the application processes messages based on message models having annotations defining constraints on deployment of data in given data aspects, wherein data aspects include: an entire message or data fields, data elements or data structures of the message;
analyze the application to identify processing nodes that reference the given data aspects having deployment constraints;
determine a restriction for a processing node based on the deployment constraints of the referenced data aspects; and
deploy each processing node of the application according to the determined restriction.

* * * * *